United States Patent [19]
Hsu et al.

[11] Patent Number: 6,038,427
[45] Date of Patent: Mar. 14, 2000

[54] METHOD AND APPARATUS FOR MEASURING GROUP DELAY FOR SATELLITE COMMUNICATIONS

[75] Inventors: Rui T. Hsu, Torrance; David D. Bettger, Redondo Beach, both of Calif.; Walter T. Iwatake, Clifton, Va.

[73] Assignee: Hughes Electronics Corporation, Los Angeles, Calif.

[21] Appl. No.: 09/092,343

[22] Filed: Jun. 5, 1998

[51] Int. Cl.[7] .......................... H04B 7/185; H04B 17/00
[52] U.S. Cl. ........................................ 455/12.1; 455/67.6
[58] Field of Search ........................ 455/10, 12.1, 67.1, 455/67.4, 67.6, 70, 504, 503, 71; 342/357.02, 357.12, 357

[56] References Cited

U.S. PATENT DOCUMENTS

| | | | |
|---|---|---|---|
| 4,956,864 | 9/1990 | Brockman | 380/34 |
| 5,125,100 | 6/1992 | Katznelson | 455/6.1 |
| 5,787,384 | 7/1998 | Johnson | 701/216 |
| 5,805,108 | 9/1998 | Lennen | 342/357 |
| 5,818,517 | 10/1998 | Hudson et al. | 348/21 |
| 5,949,372 | 9/1999 | Lennen | 342/357.02 |

*Primary Examiner*—Reinhard J. Eisenzopf
*Assistant Examiner*—Charles N. Appiah
*Attorney, Agent, or Firm*—Terje Gudmestad; Georgann S. Grunebach; Michael W. Sales

[57] ABSTRACT

The method and apparatus for determining group delay of a satellite communications channel includes a low frequency vector network analyzer and microwave swept synthesizer which together generate modulated signals. A sample of the signals transmitted to a satellite and the signals retransmitted from the satellite are compared in the network analyzer to obtain the phase of the signals. The phase of a reference signal is measured prior to and after each test frequency of the communications channel. A quasi-real time phase reference can be obtained by interpolation. Thus, the reference phase due to movement of the satellite with respect to the earth station during group delay measurement may be removed.

20 Claims, 1 Drawing Sheet

METHOD AND APPARATUS FOR MEASURING GROUP DELAY FOR SATELLITE COMMUNICATIONS

TECHNICAL FIELD

This present invention relates generally to satellite communications. More specifically, the present invention relates to group delay measurements for communications with satellites.

BACKGROUND OF THE INVENTION

Satellites orbiting the earth are used for various communication applications. Due to residual eccentricity and inclination of their orbits, even geostationary satellites change their position with respect to an earth station. Usually the movement is at a non-constant velocity.

When a ground-based transmitter sends a signal to a satellite, the phase of the received signal changes depending on the distance to the satellite and the movement of the satellite. The shift is a form of Doppler shifting, which effects the group delay measurement through a satellite communication channel.

An amplitude modulation or frequency modulation technique is widely used for group delay measurement. Phase modulation is also possible to measure group delay. The group delay ($\tau_g$) is $-\Phi/\Omega$, where $\Phi$ is the modulation signal (envelope) output phase angle in radians and $\Omega$ is the modulation signal angular frequency in radians per second. The result is a group delay measurement in seconds of the communications channel modulation signal.

One problem with such a method for determining group delay is that the formula does not take into account that the path length from the earth station to the satellite is not constant during the measurement. For example, a range change of 15 meters may result in a measured group delay change of 100 ns from the actual value.

Another problem with such a method is that in most cases, a link analyzer is employed to obtain the data. Link analyzers are expensive and thus it is desirable to eliminate them if possible.

COMSAT Laboratories as proposed a method for measuring group delay. In this proposed method, a series of phase measurements are obtained and an offset frequency is found. The group delay measurements are then obtained. This set up is complicated, however, and, due to the many steps involved, the process is difficult to control. The measurements also are not applicable if the satellite moves at a non-constant velocity.

SUMMARY OF THE INVENTION

It is therefore one object of the invention to provide a method for obtaining true group delay data that may be used to compensate for the effect of satellite movement.

In one aspect of the invention, a method for determining group delay generally comprises the steps of obtaining a reference phase, dividing a test frequency range into a plurality of test frequencies, obtaining a first test phase for a first test frequency, and comparing the test and reference phases to obtain the group delay for the frequency range.

In particular, the reference phase is obtained by generating a reference signal having a first predetermined frequency to obtain an uplink reference signal, transmitting the uplink reference signal to a satellite, repeating the uplink reference signal at the satellite to obtain a downlink reference signal, receiving the downlink reference signal from the satellite, comparing the reference signal to the downlink reference signal to obtain the reference phase.

The test phase is obtained by generating a test signal for one of the plurality of the test frequencies to obtain an uplink test signal, transmitting the test signal to the satellite, translating the test signal at the satellite to obtain a downlink test signal, receiving the downlink test signal from the satellite, and comparing the test signal to the downlink test signal to obtain a test phase.

In a further aspect of the invention, an apparatus for determining group delay includes a synthesizer and a network analyzer coupled to the synthesizer. The synthesizer in combination with the analyzer generates test signals and reference signals. An antenna is coupled to the synthesizer and the analyzer for transmitting test signals and reference signals to the satellite. The antenna further receives repeated signals from the satellite.

A computer is coupled to the synthesizer and the analyze. The computer initiates a transmission of the reference signals and test signals so that a reference signal is initiated prior to and after a test signal. The computer obtains a test phase associated with the test signal and a reference phase associated with the reference signals, and then calculates a group delay from the test phase and the reference phase.

One advantage of the invention is that conventional equipment may be used to perform the group delay measurement. A link analyzer does not have to be used. This reduces the cost of implementation of such a procedure.

Another advantage of the invention is that before and after each test frequency signal, a frequency reference signal is generated. This improves the accuracy of the group delay calculation.

These and other features and advantages of the present invention will become apparent from the following description of the invention, when viewed in accordance with the accompanying drawings and appended claims.

BEST MODES FOR CARRYING OUT THE INVENTION

Figure 1:
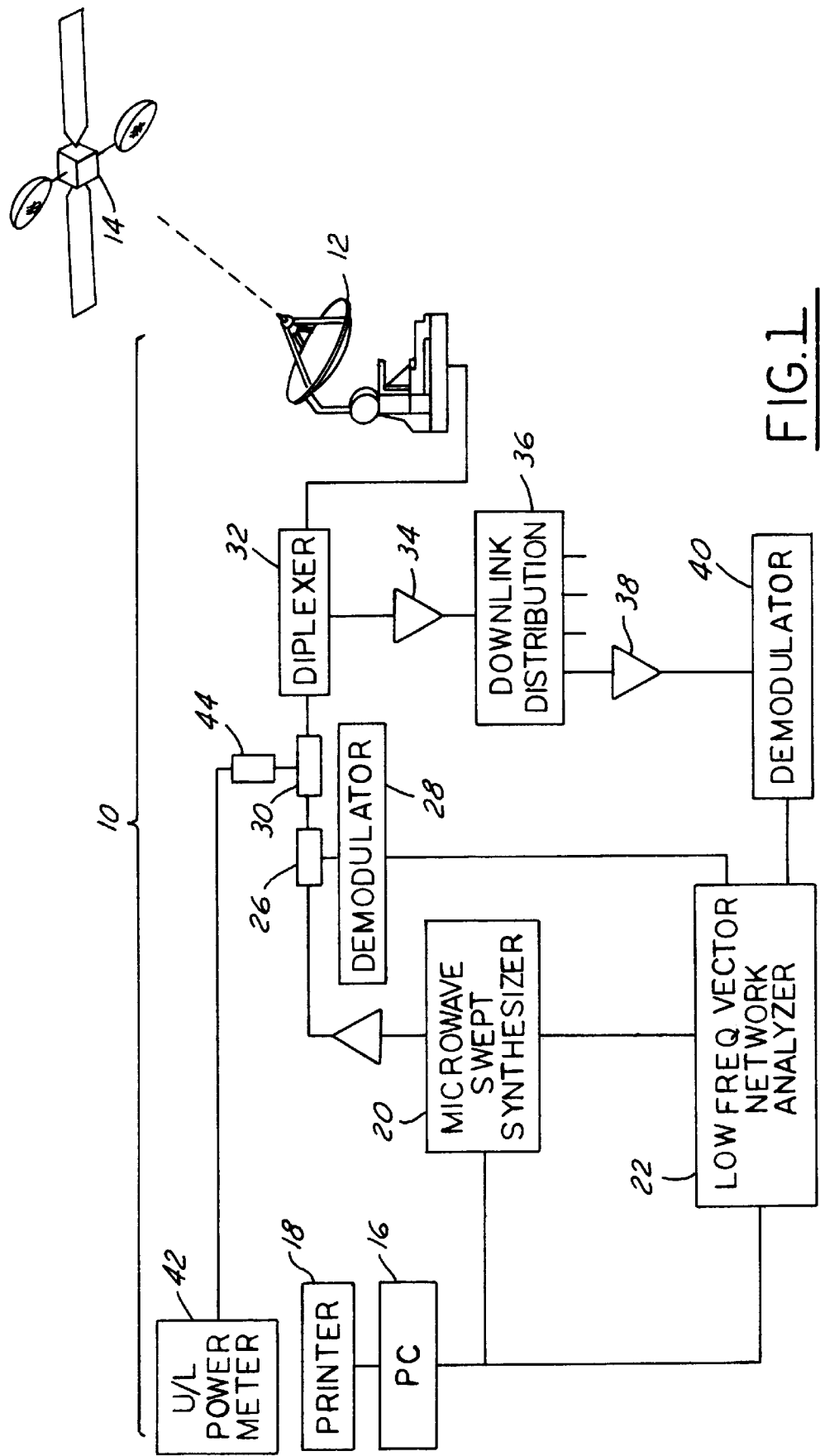
FIG. 1 is a diagrammatic representation of a satellite communication system for use in implementing the present invention.

Referring now to the Figure, an earth station has an antenna 12 that is used to transmit and receive signals from a satellite 14. Satellite 14, among its many other functions, may receive an uplink signal from antenna 12, translate the signal and transmits a downlink signal back to antenna 12 via a transponder (not shown).

Earth station 10 has a controller such as a personal computer 16 or other electrical controller used for obtaining an orbit group delay measurements. Personal computer 16 may have a printer 18 and other common peripheral devices coupled thereto for providing print-outs of the data obtained.

Personal computer 16 is coupled to and controls a microwave swept synthesizer 20 and a low-frequency vector network analyzer 22. Microwave swept synthesizer 20 generates the microwave carrier frequencies across the channel to be tested. The desired frequencies may be obtained from the computer 16.

Low frequency network analyzer 22 provides a modulation signal to the microwave swept synthesizer 20 to modulate the microwave carrier. As will be described further below, computer 16 controls the timing and frequencies generated by microwave swept synthesizer 20 and analyzer 22. Thus, the combination of analyzer 22 and synthesizer 20 generate an amplitude modulated, frequency modulated or phase modulated signal. It is also possible that the modulation signal can be generated by the synthesizer 20 if a synthesizer is available with that feature.

The modulated signal generated by synthesizer 20 and analyzer 22 is amplified in a conventional high power amplifier 24. High power amplifier 24 provides a desirable signal strength for transmission.

The amplified signal from high power amplifier 24 is routed through a first directional coupler 26. Directional coupler 26 can be a conventional coupler commonly used in the art. Directional coupler 26 is used as a monitoring point for the signals passing therethrough. A sample of the signal from high power amplifier 24 is routed through a demodulator 28 and to analyzer 22. Demodulator 28 demodulates the sampled signal before being used as an input to analyzer 22.

The signal from high power amplifier 24 is routed through a second directional coupler 30, a diplexer 32, and ultimately to antenna 12 which transmits the signal to satellite 14. For this application, satellite 14 receives the transmitted signal, translates and amplifies it and generates a downlink signal to ground station antenna 12. The downlink signal is essentially a replica of the uplink signal, but with different carrier frequencies.

Diplexer 32 is coupled to antenna 12 and routes the received downlink signal through a low noise amplifier 34, a downlink distributor 36, a microwave amplifier 38, a demodulator 40 and then to analyzer 22 in a conventional manner. The received downlink signal is demodulated as it passes through demodulator 40.

Directional couplers 30 is used primarily for monitoring the signals in the circuit. The monitoring function is desirable to initially prove out the procedure. Directional coupler 26 is used to get an uplink sample, which is demodulated and is used as an input to network analyzer 22 reference input. In this way the group delay contribution from the synthesizer and amplifier 24 and compensated for when received in analyzer 22.

An uplink power meter 42 through a sensor 44 may be coupled to second directional coupler 30 in a conventional manner. Power meter 42 and sensor 44 are used to monitor the output conditions of the signals prior to transmission to ensure the signals have power levels suitable for transmission and testing.

In operation, the above-described system is employed to perform a frequency "hopping" technique to obtain a more accurate in-orbit group delay measurement than those previously known. That is, every other measurement is a reference measurement.

Commonly, group delay measurements are made over a desirable test frequency range B. The test frequency range preferably corresponds to a range of frequencies in a desired communications channel. The test frequency range is divided into N equally spaced test points. Therefore, there are (N−1) segments and each frequency has a step of $\Delta f$ which is equal to $B/(N-1)$.

Preferably, N is an odd number. By providing N as an odd number, the exact center channel frequency $F_c$ will be a test point. With N as an odd number, there are an even number of segments.

The first data point obtained is the phase of a reference signal. The reference signal is preferably the center channel frequency $F_c$. The signal is developed as described above using analyzer 22 and synthesizer 20. The reference signal is routed through amplifier 24 and directional coupler 26. A portion of the reference signal is sampled and demodulated and is routed to analyzer 22. The reference signal is transmitted to satellite 14 by antenna 12.

Satellite 14 receives the reference signal and generates a downlink reference signal. The downlink reference signal is received by antenna 12. The downlink reference signal is routed to analyzer 22. Both phases of the demodulated downlink reference signal and the demodulated uplink reference signal are determined in analyzer 22. A phase difference between the amplified reference signal and the downlink reference signal may be determined in analyzer 22.

Preferably, every other point, that is, the first point, last point and every second point is a reference signal which in this case is preferably at the center frequency.

The second signal generated corresponds to one of the test frequencies within a segment of the frequency range into which the channel has been divided. This operation may be performed in an ascending order or a descending order. The lower edge of the frequency range $F_L$ equal to $[F_c-(N-1)\Delta f]/2$. The same process as described above with respect to the center frequency hen repeated. That is, analyzer 22 and synthesize 20 are used to generate modulated test signal corresponding to $F_L$. For this example, an ascending order is used. A sample of the signal is demodulated and routed to analyzer 22. The test signal is then transmitted to satellite 14 by antenna 12.

Satellite 14 retransmits a downlink test signal to antenna 12. The downlink test signal is routed to analyzer 22. Analyzer 22 measures the test phase difference of the test signal. After determining the phase of the first test point, the next data point obtained is another reference signal (channel center) frequency data point.

The next data point after the second reference signal corresponds to the next segment in the communications channel. The next segment of the channel has a frequency of $F_L+\Delta f$. This sequence is repeated until the highest frequency $F_H$ of the channel is reached. The final test point is a center channel frequency $F_c$.

A reference phase angle is obtained prior to and after every phase measurement of segment of the communications channel. Thus, the exact phase reference is not determined, since the reference phase and the test segment phase cannot be simultaneously measured. Therefore, the actual phase reference corresponding to the test reference is interpolated for each test frequency segment. Various types of interpolation may be performed. In the simplest form, the phase angle of the frequency reference signal prior to and after each test frequency signal may be averaged. That is, the sum of the phase angle prior to and after the test frequency signal may be added and divided by 2. Of course, quadratic or other higher order types of interpolation may be performed. It is believed, however, that averaging provides sufficiently accurate results for most applications.

The formula for improved group delay ($\tau_g$) according to the present invention may be represented by $\tau_g(2K)=-[\Phi_m(2K)-\Phi_r(2K)]/\Omega$, for K=1 to N. 2K corresponds to every other phase angle determined. That is, 2K corresponds to the test segments. $\Phi_m$ is the measured phase angle for the test signal. $\Phi_r$ is the interpolated phase angle of the reference signal that corresponds to the timing of the test frequency signal. $\Omega$ is the modulation angular frequency in radians per second. The factor $\Phi_r$ thus removes any error due to satellite movement during measurement at every test segment of the channel.

While the best mode for carrying out the present invention has been described in detail, those familiar with the art to which this invention relates will recognize various alternative designs and embodiments for practicing the invention as defined by the following claims:

What is claimed is:

1. A method of determining group delay for communications with a satellite comprising the steps of:
   (a) obtaining a reference phase by,
      (i) generating a reference signal having a first predetermined frequency to obtain an uplink reference signal;
      (ii) transmitting the uplink reference signal to a satellite;
      (iii) translating the reference signal at the satellite to obtain a downlink frequency reference signal;
      (iv) receiving the downlink reference signal from the satellite;
      (v) comparing the reference signal to the downlink reference signal to obtain a reference phase;
   (b) dividing a test frequency range into a plurality of test frequencies;
   (c) obtaining a test phase by,
      (i) generating a test signal for one of the plurality of test frequencies to obtain an uplink test signal;
      (ii) transmitting the test signal to the satellite;
      (iii) translating the uplink test signal at the satellite to obtain a downlink test signal;
      (iv) receiving the downlink test signal from the satellite;
      (v) comparing the test signal to the downlink test signal to obtain a test phase;
   (d) repeating the step of obtaining a test phase for another of the plurality of test frequencies; and
   (e) comparing each test phase for said plurality of test frequencies and the reference phase to obtain a group delay for the test frequency range.

2. A method of determining group delay as recited in claim 1 wherein the step of generating a reference signal comprises the step of generating an amplitude modulated reference signal.

3. A method of determining group delay as recited in claim 2 wherein the step of generating a test signal comprises the step of generating an amplitude modulated test signal.

4. A method of determining group delay as recited in claim 3 further comprising the step of demodulating the test signals and the reference signal.

5. A method of determining group delay as recited in claim 1 wherein said step of generating a reference signal comprises the step of generating a reference signal corresponding to a center frequency of the test frequency range.

6. A method of determining group delay as recited in claim 1 wherein the step of comparing the test phase and the reference phase comprises the step of subtracting the test phase and the reference phase and dividing a result by a modulation angular frequency.

7. A method of determining group delay as recited in claim 1 further comprising the step of obtaining a reference phase both before and after each step of obtaining a test phase.

8. A method of determining group delay as recited in claim 7 wherein the step of obtaining the phase reference includes the step of interpolating the reference phase.

9. A method of determining group delay as recited in claim 1 wherein the step of dividing the test frequency range includes the step of dividing the test frequency range into an even number of segments.

10. A method of determining group delay for communications with a satellite comprising the steps of:
   generating a first reference signal having a first predetermined frequency to obtain a first uplink reference signal;
   transmitting the first uplink reference signal to a satellite;
   translating the uplink reference signal at the satellite to generate a first downlink reference signal;
   receiving the first downlink reference signal from the satellite;
   comparing the first reference signal to the downlink reference signal to obtain a first reference phase;
   dividing a test frequency range into a plurality of test frequencies;
   generating a test signal at each of the test frequencies;
   transmitting each of the test signals to the satellite;
   translating each of the test signals at the satellite to obtain downlink test signals;
   receiving the downlink test signals from the satellite;
   comparing each of the test signals to the downlink test signal to obtain a test phase;
   generating a second reference signal at the first predetermined frequency to obtain a second uplink reference signal;
   transmitting the second downlink reference signal to the satellite;
   translating the second uplink reference signal from the satellite to obtain a second downlink reference signal;
   receiving the second downlink reference signal from the satellite;
   comparing the second reference signal to the second downlink reference signal to obtain a second reference phase;
   calculating an interpolated reference phase from the first reference phase and the second reference phase corresponding to the test frequency signal; and
   comparing each test phase for said plurality of test frequencies and the interpolated reference phase to obtain a group delay for the test frequency range.

11. A method of determining group delay as recited in claim 10 wherein the step of generating a reference signal comprises the step of generating an amplitude modulated reference signal.

12. A method of determining group delay as recited in claim 11 wherein the step of generating a test signal comprises the step of generating an amplitude modulated reference signal.

13. A method of determining group delay as recited in claim 12 further comprising the steps of demodulating the test signals and the reference signals.

14. A method of determining group delay as recited in claim 10 wherein the step of dividing the test frequency range includes the step of dividing the test frequency range into an even number of segments.

15. A method of determining group delay as recited in claim 10 wherein the step of comparing the test phase and the interpolated reference phase comprises the step subtracting the test phase and the reference phase and dividing a result by a modulation angular frequency.

16. An apparatus for determining group delay for communications with a satellite comprising:

a synthesizer;

a network analyzer coupled to said synthesizer, said synthesizer in combination with said analyzer generating test signals and reference frequency signals;

an antenna coupled to said synthesizer and said analyzer for transmitting test signals and reference signals to the satellite, said antenna further receiving repeated signals from the satellite; and a computer coupled to said synthesizer and said analyzer, said computer initiating a transmission of said reference signals and test signals so that a reference signal is initiated prior to and after a test signal, said computer obtaining a test phase associated with said test signal and a reference phase associated with said reference signals, said computer calculating a group delay from said test phase and said reference phase.

17. An apparatus for determining group delay for satellite communications as recited in claim 16 wherein said test signals and said reference signals are amplitude modulated.

18. An apparatus for determining group delay for satellite communications as recited in claim 17 further comprising a demodulator, said demodulator demodulating said amplitude modulated signals.

19. An apparatus for determining group delay for satellite communications as recited in claim 16 wherein said test signals correspond to one of a plurality of segments of a channel.

20. An apparatus for determining group delay for satellite communications as recited in claim 16 wherein said reference signal corresponds to a center frequency of the said channel.

* * * * *